United States Patent
Bruck

(10) Patent No.: US 6,543,855 B2
(45) Date of Patent: Apr. 8, 2003

(54) CUP STYLE SPACER FOR ATTACHING AN UPPER ARM TO A SEAT FRAME FORMING A PART OF A SEAT INTEGRATED RESTRAINT MECHANISM

(75) Inventor: Stephen C. Bruck, Fraser, MI (US)

(73) Assignee: Bae Industries, Inc., Centerline, MI (US)

(*) Notice: Subject to any disclaimer, the term of this patent is extended or adjusted under 35 U.S.C. 154(b) by 0 days.

(21) Appl. No.: 09/938,984

(22) Filed: Aug. 24, 2001

(65) Prior Publication Data

US 2003/0038524 A1 Feb. 27, 2003

(51) Int. Cl.[7] .................................................. B60N 2/68
(52) U.S. Cl. ........................... 297/440.21; 297/452.18; 297/440.16; 411/183; 411/180
(58) Field of Search ....................... 297/452.18, 440.16, 297/440.21; 403/187, 188, 408.1; 411/180, 179, 183

(56) References Cited

U.S. PATENT DOCUMENTS

| | | | | |
|---|---|---|---|---|
| 2,648,256 A | * | 8/1953 | Budreck | 248/483 |
| 3,599,691 A | | 8/1971 | Hughes | 151/41.73 |
| 3,750,525 A | | 8/1973 | Waters et al. | 85/70 |
| 4,613,264 A | | 9/1986 | McIntyre et al. | 411/55 |
| 4,820,076 A | | 4/1989 | Rossigno | 403/284 |
| 4,966,512 A | | 10/1990 | Takaku | 411/181 |
| 5,462,332 A | | 10/1995 | Payne et al. | 297/216.1 |
| 5,634,754 A | | 6/1997 | Weddendorf | 411/354 |
| 5,795,024 A | * | 8/1998 | Collins et al. | 297/361.1 |
| 5,826,944 A | * | 10/1998 | Beneker et al. | 297/440.2 |
| 5,868,535 A | | 2/1999 | Ladouceur | 411/181 |

\* cited by examiner

Primary Examiner—Peter M. Cuomo
Assistant Examiner—Stephen D'Adamo
(74) Attorney, Agent, or Firm—Gifford, Krass, Groh, Sprinkle, Anderson & Citkowski, P.C.

(57) ABSTRACT

A fastener assembly for attaching a seat back to a seat bottom forming a part of a recliner mechanism. The seat back includes a plurality of apertures defined therethrough. The seat bottom includes a pivotally engaged and extending arm having a first side and a second side and to which the seat back is engaged. The fastener assembly includes a substantially cup shaped spacer having an inner annular rim defining an open interior. A multi-sided nut is provided having an enlarged and substantially annular shaped end portion integrally formed therewith. A polygonal recess is defined through the lower seatback arm and matches an exterior configuration of the nut to permit insertion of the nut through the recess and so that the enlarged annular portion abuts against the first side of the arm and the nut extending beyond the second side and through the inner annular rim defined in the spacer. Edge portions of the nut associated with boundaries established between each pair of adjoining sides are then shear against cup spacer and to secure the nut and spacer to the arm. Upon aligning the apertures in the seat back with the assembled nut and cup spacer secured to the extending arm, bolt fasteners engage the seat back to the seat bottom.

6 Claims, 2 Drawing Sheets

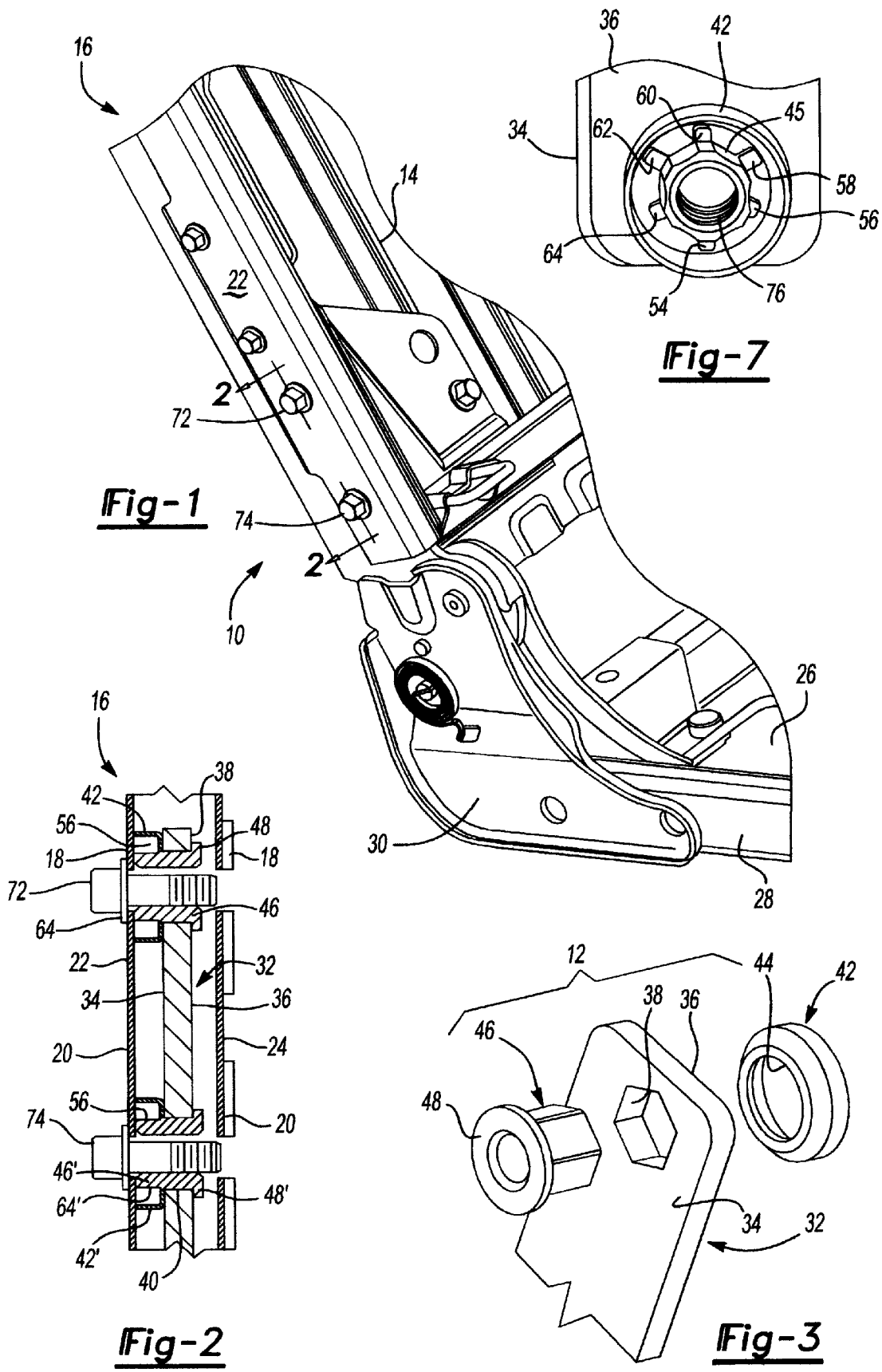

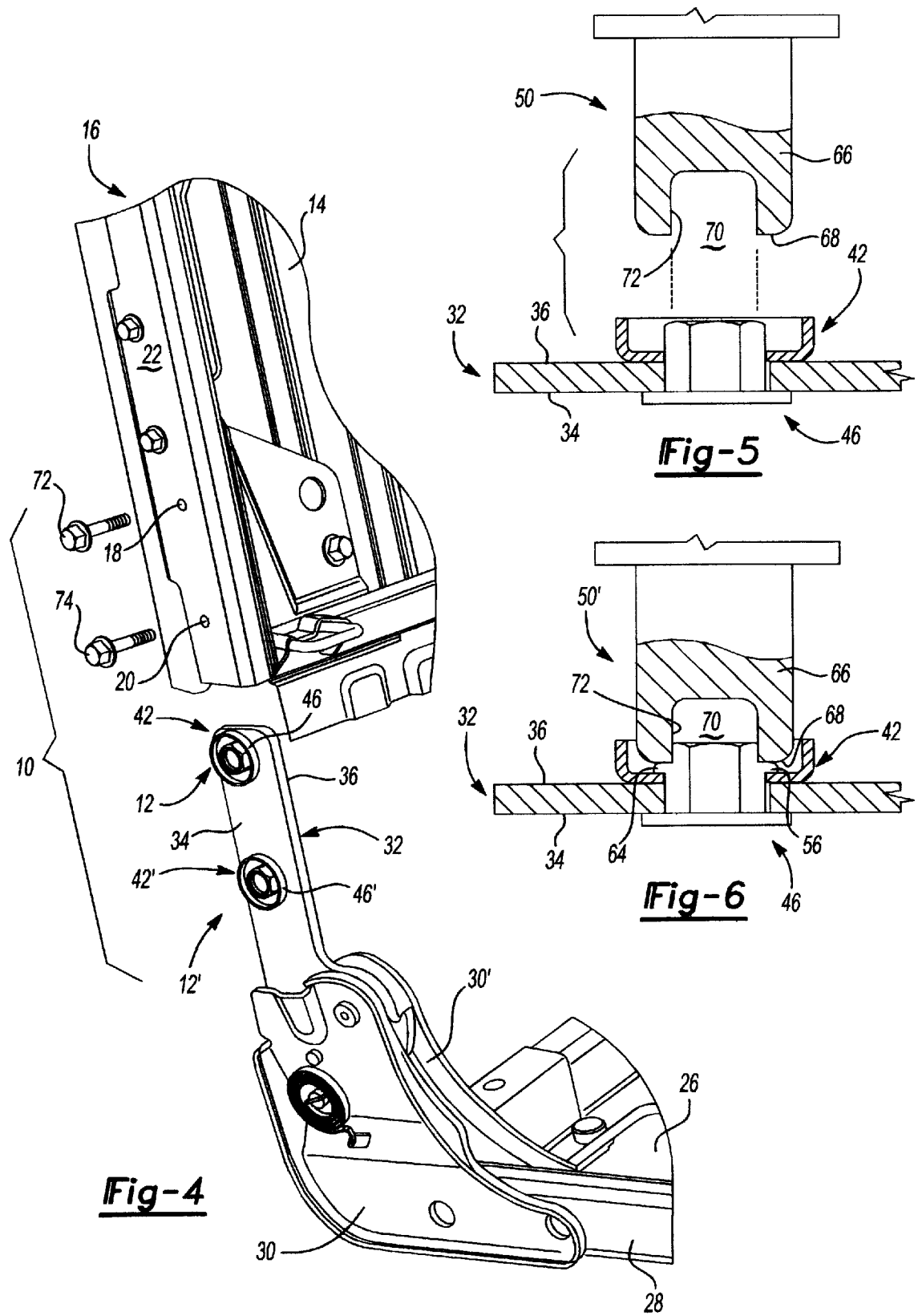

CUP STYLE SPACER FOR ATTACHING AN UPPER ARM TO A SEAT FRAME FORMING A PART OF A SEAT INTEGRATED RESTRAINT MECHANISM

BACKGROUND OF THE INVENTION

1. Field of the Invention

The present invention relates generally to seat back and seat frame constructions forming portions of seat integrated restraint assemblies. More particularly, the present invention discloses a cup-style spacer for attaching an upper arm of a seat back to a seat frame, as well the shear staking the attachment nut with the cup spacer in order to maintain a "hard clamped" condition and to prevent loosening of the spacer.

2. Description of the Prior Art

Seat integrated restraint assemblies are known in the art for vehicle applications and typically a seat back secured through the use of fasteners to a seat bottom. Due to the various types of inertial loads and forces applied to seat integrated restraint assemblies, the integrity of the attachment of the upper arm to the seat frame is critical. It has further been found that the use of a simple nut in engagement with a bolt will not withstand the vibration testing parameters established for ensuring that the bolt and nut will not loosen or separate in use.

One attempt at resolving the problem of loosening of the bolt and nut has been the provision of a spacer/nut assembly in which the contact surface of the spacer mates with the seat frame rather than the nut surface. In this manner, the seat frame is locked to the spacer and the bolt is always under tension regardless of vibration or lateral movement of the seat frame. However, it has been found that the use of such spacer/nut assemblies suffer from the shortcomings of the relative mass associated with the machined and solid steel spacer, as well as limitations as to its use with typical nuts which also require specific machining processes, making the spacers and nuts fairly expensive to produce.

Additionally, the machining process known as "shear staking" or "upset staking" (that being the forcible scraping or compressing of portions of material from an object) is also known in the art. In particular, it is known in the art to upset stake a two-piece nut and collar spacer assembly, such as described in the prior art above, and for the purpose of securing a seatback arm to a seat bottom frame.

An additional prior art example of a staked stud and shell arrangement is illustrated in U.S. Pat. No. 4,820,076, issued to Rossigno, and which teaches the shell as including openings with a reinforcing ring that is offset from a planar surface. The stud has a head with a groove located between the shank and an arcuate section adjacent its periphery. The ring is located in the groove and a cylindrical section adjacent the head is sheared to define a flange that engages the ring, causing a portion thereof to flow around the ribs, in the groove and seal a pair openings.

SUMMARY OF THE PRESENT INVENTION

The present invention discloses a fastener assembly including a novel cup-style spacer for attaching an upper arm of a seat back to a seat bottom forming a part of a recliner mechanism, as well the shear staking the interiorly hollowed attachment nut with the cup spacer in order to maintain a "hard clamped" condition and to prevent loosening of the spacer. In particular, the cup-style spacer provides a unique and two piece assembly for use in securing the seat back to the seat bottom and is a specific improvement over prior art solid steel spacers in that it provides the ability to flex about its radius adjacent to the upper seat back arm. This allows the cup spacer to compensate for irregularities, such as out of flat condition, in the mating surface of the seat frame.

In the preferred embodiment, the seat back includes first and second extending sides, each side having at least one aperture defined therethrough. The corresponding seat bottom includes first and second pivotally engaged and extending arms, each of the arms having a first side and a second side with at least one recess defined therethrough.

The fastener assembly further includes a plurality of substantially cup shaped spacers, each of the spacers having an inner annular rim defining an open interior. A plurality of multi-sided nuts are provided (typically hex headed nuts). Each of the nuts has an enlarged and substantially annular shaped end portion integrally formed therewith. An exterior configuration of each of the nuts matches the configuration of the recesses in the arms pivotally associated with the seat frame and to permit insertion of the nuts through the recesses, the enlarged annular portions abutting against the first side of each of the arms, the nuts extending beyond the second side of each arm and through the inner annular rims defined in each of the spacers.

Edge portions of each of the nuts, which are associated with boundaries established between each pair of adjoining sides, are shear staked staking against the cup spacer and to secure each of the assembled and shear staked nut and spacers to each of the first and second arms. Upon aligning the apertures located in the first and second sides of the seat back with the assembled nut and cup spacers staked to the extending arms, threaded bolt fasteners engage the seat back to the seat bottom by virtue of rotatably engaging against the inner threads defined through each of the nuts.

Additional features include the provision of a punch for shear staking the nut to the cup spacer. The punch includes an actuating portion, an end face of the actuating portion being defined by an outer annular projection in turn defining a centrally disposed and inwardly recessed interior. An inwardly facing and annular surface defining the projection being dimensioned to shear specified volumes of material associated with each of the edge portions of said multi-sided nut and in collapsing fashion against the inward bowl shape of the cup spacer in proximity to its inner annular rim.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective view of a seatback recliner mechanism employing the cup-style and shear staked spacers according to the present invention.

FIG. 2 is an enlarged and cutaway view taken along line 2—2 of FIG. 1 and further illustrating manner in which mounting bolts engage the shear staked cup spacers and nuts;

FIG. 3 is an enlarged sectional view exploded to illustrate an end configuration of the lower seatback arm extending from the seat integrated restraint assembly, as well as the hex aperture defined in the arm for assembling the cup style spacer and nut;

FIG. 4 is an exploded view of the seatback recliner mechanism, similar to that illustrated in FIG. 1, and showing the manner in which the subsequent inserting bolts are applied to secure the upper seat back portion to the shear staked cup spacer assembled on the lower seatback arm;

FIG. 5 is an illustration of a punch process, pre-engagement, for shear staking the cup spacer to the assembled nut and with the lower seatback arm sandwiched therebetween;

FIG. 6 is a second illustration of the punch process, fully engaged, and illustrating the manner in which the edge portions of the nut are staked against the inner cup surface of the spacer; and FIG. 7 is an end section view of the lower seatback arm and cup spacer and illustrating the manner in which the associated edge sections of the nut are shear staked to the spacer.

DETAILED DESCRIPTION OF THE PREFERRED EMBODIMENTS

Referring now to FIG. 1, an illustration is shown at 10 of a seatback recliner mechanism and which incorporates a fastener assembly featuring a shear-staked and cup style spacer arrangement (see at 12 in FIGS. 3 and 4) according to the present invention. As previously described, the cup-style spacer is a novel improvement over the prior art for attaching an upper arm of a seat back to a seat frame, as well the shear staking the interiorly hollowed attachment nut with the cup spacer, and in order to maintain a "hard clamped" condition and to prevent loosening of the spacer. The cup-style spacer and nut arrangement of the present invention also improves upon the prior art in that it does away with the need for other prior art types of nut and spacer assemblies, which are both expensive to produce and add significant weight to the overall fastener assembly.

The seat recliner mechanism 10 includes a seatback 14, which is understood to have first and second extending sides, however (and for purposes of ease of illustration) selected side 16 is illustrated in the partial views of FIGS. 1 and 4. Each side has at least one, and preferably a plurality of, apertures 18 and 20 defined therethrough. The associated side 16 of the seat back 14 may further be defined by an outer edge 22 and a spaced apart and inner edge 24, with the apertures 18 and 20 being defined in aligning fashion through each of the outer 22 and inner 24 edges. The remaining features 14 of the seat back are within the knowledge of one skilled in the art and need not be restated herein.

The seat recliner mechanism 10 further includes a seat bottom 26, likewise having first and second sides, with only a first selected side 28 being illustrated again in the partial views of FIGS. 1 and 4. Interconnecting plate portions (see pair of spaced apart plates at 30 and 30' for illustrated side 28) form a part of the seat recliner mechanism and are secured to each side of the seat bottom 26.

Typically, an arm (see at 32 in exploded illustration of FIG. 4) is engaged between the plates 30 and 30', in turn engaged to the seat bottom 26, and extends in pivotally actuable fashion therefrom. It is again understood that a pair of such arms are typically provided for the opposite sides of the seat bottom and each of the arms (see again selected arm 32 for first selected side 28 of seat bottom 26) has a first side 34 and a second side 36. Recesses (see at 38 in FIG. 3) are defined extending through the sides 34 and 36 of the arm 32, each of the recesses being defined by a particular and multi-sided shape, such as corresponding to inwardly facing and interconnected surfaces matching a hex head shape. Referring again to the sectional cutaway view of FIG. 2, a second recess 40 is illustrated in spaced apart fashion from the first recess 38 and it is further understood that any plurality of recesses may be formed in the pivotally extending arms of the seat bottom.

The above substantially repeats the broadest aspects of a conventional seat recliner mechanism and such as may be utilized by the fastener assembly 12 according to the present invention. A more detailed description will now be had as to the aspects of the shear staking assembly which is utilized for assisting in securing the seatback 14 to the arms (by example at 32) of the seat frame 26 and in order to maintain a "hard clamped" condition and to prevent loosening of the assembly.

A plurality of substantially cup shaped spacers 42, 42', et seq. (see FIGS. 2 and 4) are provided. Each of the cup shaped spacers 42, 42' has a substantial bowl shaped body and which is further defined by an inner annular rim (see in particular at 44 for first spacer 42 in FIG. 3). The cup shaped spacers 42, 42', et seq. are further preferably constructed of a grade steel or other suitable material.

A plurality of multi-sided nuts are provided, see at 46, 46', et seq. Each of the nuts (see in particular at 46 in FIG. 3) includes a specified and multi-sided configuration such as a hex head. It is also understood that square heads, octagonal shaped heads or any other desired polygonal shape can be used with the nut and without deviating from the scope of the invention. An enlarged and substantially annular shaped end portion 48 is integrally formed with the nut 46 and, referring also to cutaway sectional of FIG. 2, a like annular end shaped portion 48' is also shown for the nut 46'.

An exterior configuration of each of the nuts 46, 46', et seq., matches the multi-sided and recess configuration 38, 40, et seq., defined in the arms (see again at 34 and in particular in enlarged sectional view of FIG. 3) to permit insertion of the nuts through the recesses. The enlarged annular portions 48, 48', et seq., abut against the first side (34) of each of the arms (32), the nuts extending beyond the second side (36) of each arm (32) and through the inner annular rims (44) defined in each of the spacers (42).

At this point, the cup-style spacer 42 and nut 46 is assembled about the arm 34 and is ready to be shear staked. Shear staking, or upset staking, is by itself a process known in the art for other applications and typically includes the provision of a punch, see in pre-actuated position 50 in FIG. 5 and post actuated position 50' in FIG. 6. The punch 50 is employed for shear staking the edge portions of the nut against the cup spacer and, as best illustrated in FIG. 7, edge portions 54, 56, 58, 60, 62 and 64 are shown which correspond respectively to each adjoining edge between succeeding and interconnecting sides of the hex nut. Reference is also made in FIG. 2 to staked locations 56 and 64 for cup shaped spacer 42, and to staked locations 56' and 64' for corresponding cup shaped spacer 42'. Along these lines, different numbers of shear stake portions would be created for different nut configurations, such as four such staked portions for a square nut or seven staked portions for an octagonal shaped nut.

Referring back to FIGS. 5 and 6, the punch 50 is again illustrated in a pre-actuated and spaced position and includes an actuating portion 66 which functions as a die cutting portion of the punch. An end face of the actuating portion 66 defined by an outer annular projection 68 defining a centrally disposed and inwardly recessed interior 70. An inwardly facing and annular surface 72 defining the projection 68 and recessed interior 70 is dimensioned to shear specified volumes of material associated with each of the edge portions (e.g. again at 54, 56, 58, 60, 62 and 64) of the multi-sided nut 46, against the inner bowl surface of the associated cup spacer 42, and upon the punch being actuated to the second position 50' as illustrated in FIG. 6.

Each of the nuts 46, 46' et seq., associated with boundaries established between each pair of adjoining sides, are shear staked staking against the associated cup spacers 42, 42', et seq., and in order to secure each of the nut and spacer arrangements to the first and second arms extending from the seat bottom 26. Upon aligning the apertures in the first and second sides of said seat back (see again apertures 18 and 20 formed within the partial illustration of the first side 16 of seat back 14) with the assembled nut and cup spacers (see again at 12 and 12' in exploded view of FIG. 4), the seat back is secured to the extending arms, and thereby to the seat bottom. This is accomplished through the use of threaded bolt fasteners, see at 72 and 74. The bolt fasteners 72, 74, et seq., each include a shank portion with a plurality of externally configured threads and which, upon being inserted in the manner illustrated by the side cutaway of FIG. 2, interengage with internal threads (see at 76 in FIG. 7) formed within the interiorly passage in the nut 46 and to interengage the seat back to the seat bottom.

It is evident therefore that the present invention teaches a novel shear stake arrangement incorporation a cup-style spacer and nut which is an improvement over prior art fastening structure for securing a seat back to a seat bottom of a recliner mechanism. Having described our invention, additional preferred embodiments will become apparent to those skilled in the art to which it pertains and without deviating from the scope of the appended claims.

I claim:

1. A fastener assembly for attaching a seat back to a seat bottom forming a part of a recliner mechanism, the seat back including at least one aperture defined through a side of the seat back, the seat bottom including a pivotally engaged and extending arm having a first side and a second side and to which the seat back is engaged, said fastener assembly comprising:

a substantially cup shaped spacer having an inner annular rim defining an open interior;

a multi-sided nut having an enlarged and substantially annular shaped end portion integrally formed therewith;

a polygonal recess defined through the extending arm and matching an exterior configuration of said nut to permit insertion of said nut through said recess, said enlarged annular portion abutting against the first side of the extending arm and said nut extending beyond the second side and through said inner annular rim defined in said cup shaped spacer;

edge portions of said nut associated with boundaries established between each pair of adjoining sides being shear staked against said cup shaped spacer and to secure said nut and said cup shaped spacer to the extending arm; and upon aligning the apertures in the seat back with said nut and said cup shaped spacer secured to the extending arm, bolt fasteners engaging the seat back to the seat bottom.

2. The fastener assembly as described in claim 1, the seat bottom having a first arm extending from a first side of the seat bottom and a second arm extending from a second side of the seat bottom, said assembly further comprising a first shear staked cup spacer and nut secured to the first extending arm and a second shear staked cup spacer and nut secured to the second extending arm.

3. The fastener assembly as described in claim 1, further comprising a punch for shear staking said edge portions of said nut against said cup shaped spacer.

4. The fastener assembly as described in claim 3, said punch further comprising an actuating portion, an end face of said actuating portion defined by an outer annular projection defining a centrally disposed and inwardly recessed interior, an inwardly facing and annular surface defining said projection being dimensioned to shear specified volumes of material associated with each of said edge portions of said multi-sided nut.

5. The fastener assembly as described in claim 1, said nut including a plurality of internally configured threads arranged upon a centrally extending aperture, said bolt fastener including a shank portion with a plurality of externally configured threads and for rotatably engaging said internal threads within said nut upon inserting said bolt fastener.

6. A seat recliner mechanism incorporating a fastener assembly for attaching a seat back to a seat bottom of the recliner mechanism, said seat recliner mechanism comprising:

said seat back including first and second extending sides, each side having at least one aperture defined therethrough;

said seat bottom including first and second pivotally engaged and extending arms, each of said extending arms having a first side and a second side with at least one recess defined therethrough;

said fastener assembly further comprising:

a plurality of substantially cup shaped spacers, each of said cup shaped spacers having an inner annular rim defining an open interior;

a plurality of multi-sided nuts, each of said nuts having an enlarged and substantially annular shaped end portion integrally formed therewith, an exterior configuration of each of said nuts matching said recesses in said extending arms to permit insertion of said nuts through said recesses, said enlarged annular portions abutting against said first side of each of said extending arms, said nuts extending beyond said second side of each arm and through said inner annular rims defined in each of said cup shaped spacers;

edge portions of each of said nuts, associated with boundaries established between each pair of adjoining sides, being shear staked against said cup shaped spacer and to secure each of said nut and said cup shaped spacer arrangements to said first and second extending arms; and upon aligning said apertures in said first and second sides of said seat back, with said nut and said cup shaped spacers secured to said extending arms, bolt fasteners engaging said seat back to said seat bottom.

* * * * *